(12) United States Patent
Fujii

(10) Patent No.: US 7,158,314 B2
(45) Date of Patent: Jan. 2, 2007

(54) IMAGING-OPTICAL SYSTEM

(75) Inventor: Hiroaki Fujii, Tokyo (JP)

(73) Assignee: Pentax Corporation, Tokyo (JP)

( * ) Notice: Subject to any disclaimer, the term of this patent is extended or adjusted under 35 U.S.C. 154(b) by 51 days.

(21) Appl. No.: 11/074,716

(22) Filed: Mar. 9, 2005

(65) Prior Publication Data
US 2005/0200971 A1   Sep. 15, 2005

(30) Foreign Application Priority Data
Mar. 10, 2004  (JP)  ............................. 2004-067664

(51) Int. Cl.
*G02B 15/14* (2006.01)
(52) U.S. Cl. ........................................ 359/689
(58) Field of Classification Search ................ 359/676, 359/683, 689
See application file for complete search history.

(56) References Cited

U.S. PATENT DOCUMENTS

| | | | |
|---|---|---|---|
| 5,009,491 A * | 4/1991 | Hata ........................... | 359/689 |
| 5,515,208 A | 5/1996 | Yamamoto et al. | |
| 6,349,002 B1 * | 2/2002 | Shibayama et al. ......... | 359/689 |
| 6,353,504 B1 | 3/2002 | Yamamoto | |
| 6,417,973 B1 * | 7/2002 | Mihara et al. .............. | 359/684 |
| 2003/0189768 A1 | 10/2003 | Murayama | |
| 2005/0057819 A1 | 3/2005 | Eguchi | |

FOREIGN PATENT DOCUMENTS

| | | |
|---|---|---|
| JP | 11-295596 | 10/1999 |
| JP | 2001-91832 | 4/2001 |
| JP | 2001-166203 | 6/2001 |
| JP | 2003-295058 | 10/2003 |

OTHER PUBLICATIONS

U.S. Appl. No. 10/996,469 to ENOMOTO, which was filed Nov. 26, 2004.

* cited by examiner

*Primary Examiner*—Scott J. Sugarman
(74) *Attorney, Agent, or Firm*—Greenblum & Bernstein, P.L.C.

(57) ABSTRACT

An imaging-optical system includes a negative first lens group, a positive second lens group and a positive third lens group.

A zooming operation is performed by moving the second and third lens groups while an object distance to the object is being varied without varying a distance from the most object-side surface of the first lens group to the imaging plane.

An in-focus state is maintained while the focal length of the imaging-optical system is being varied through the zooming operation.

The first lens group includes cemented lens elements, and the cemented lens elements are positioned at the most object-side of the first lens group.

The cemented lens elements satisfy the following condition:

$$0.9 < Ra/fw < 2.0 \quad (1)$$

wherein

Ra designates the radius of curvature of a bonding surface of the cemented lens elements of the first lens group; and fw designates the focal length of the imaging-optical system at the short focal length extremity.

14 Claims, 14 Drawing Sheets

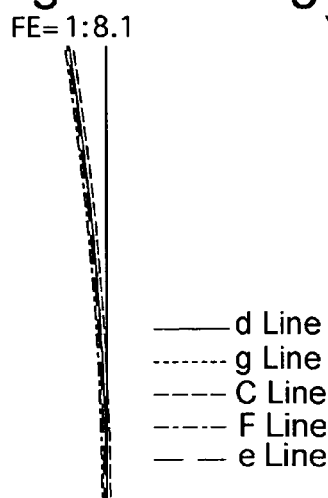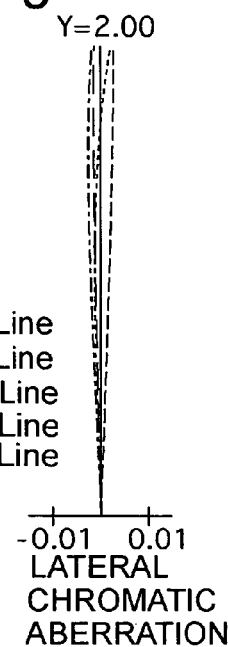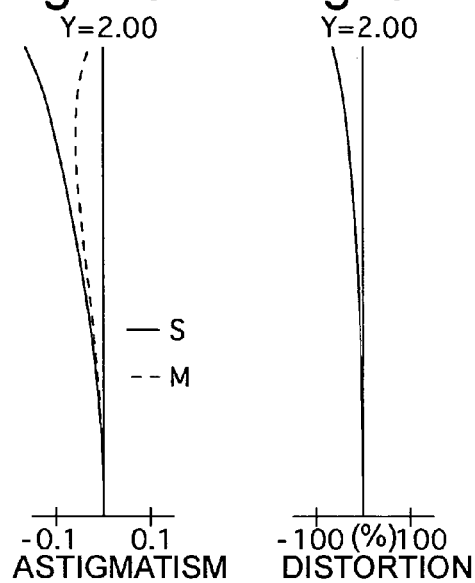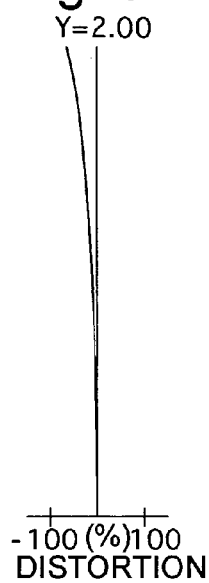
Fig. 3A
FE= 1:8.1
Fig. 3B
Y=2.00
Fig. 3C
Y=2.00
Fig. 3D
Y=2.00
—— d Line
......... g Line
---- C Line
-·-·- F Line
— — e Line
—— S
-- M
-0.1  0.1
SPHERICAL
ABERRATION
CHROMATIC
ABERRATION
-0.01  0.01
LATERAL
CHROMATIC
ABERRATION
-0.1  0.1
ASTIGMATISM
-100 (%) 100
DISTORTION
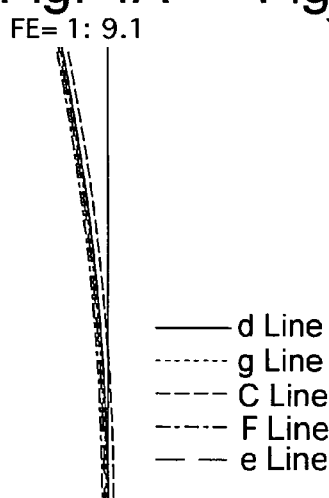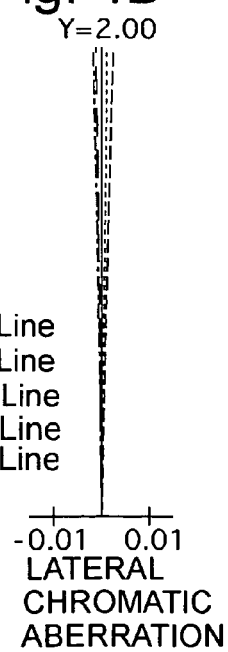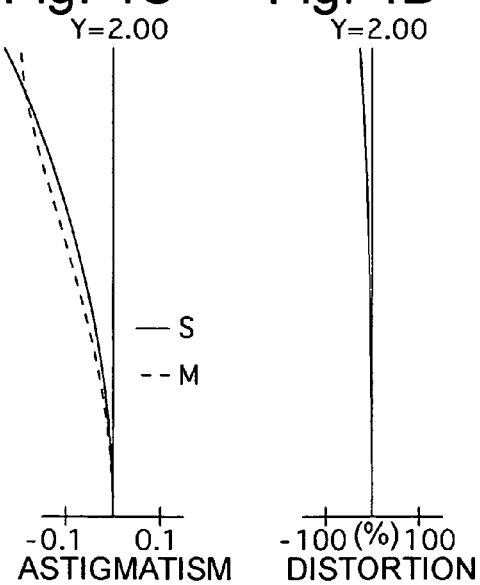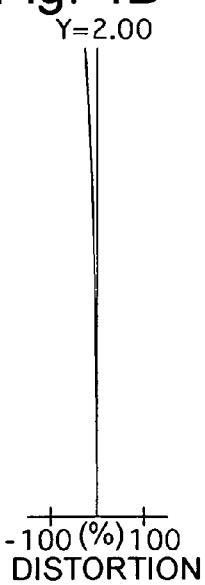
Fig. 4A
FE= 1: 9.1
Fig. 4B
Y=2.00
Fig. 4C
Y=2.00
Fig. 4D
Y=2.00
—— d Line
......... g Line
---- C Line
-·-·- F Line
— — e Line
—— S
-- M
-0.1  0.1
SPHERICAL
ABERRATION
CHROMATIC
ABERRATION
-0.01  0.01
LATERAL
CHROMATIC
ABERRATION
-0.1  0.1
ASTIGMATISM
-100 (%) 100
DISTORTION

Fig. 7A
FE= 1: 6.6
Fig. 7B
Y=1.50
Fig. 7C
Y=1.50
Fig. 7D
Y=1.50
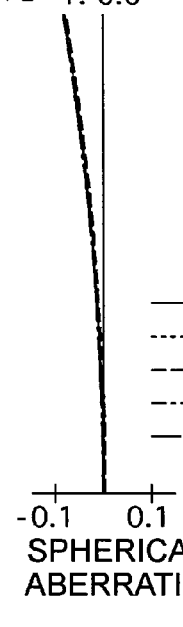
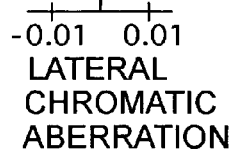
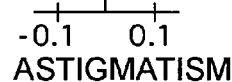
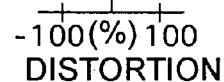
-0.1  0.1
SPHERICAL
ABERRATION
CHROMATIC
ABERRATION
-0.01  0.01
LATERAL
CHROMATIC
ABERRATION
-0.1  0.1
ASTIGMATISM
-100(%) 100
DISTORTION
d Line
g Line
C Line
F Line
e Line
— S
-- M
Fig. 8A
FE= 1: 6.9
Fig. 8B
Y=1.50
Fig. 8C
Y=1.50
Fig. 8D
Y=1.50
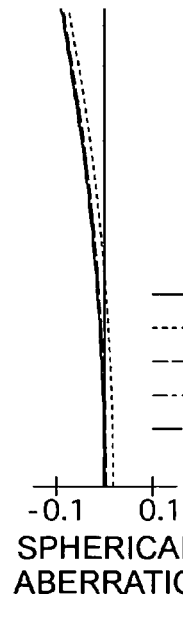
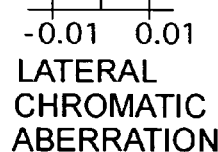
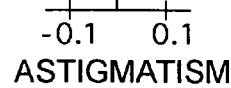
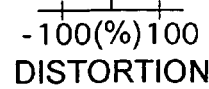
-0.1  0.1
SPHERICAL
ABERRATION
CHROMATIC
ABERRATION
-0.01  0.01
LATERAL
CHROMATIC
ABERRATION
-0.1  0.1
ASTIGMATISM
-100(%) 100
DISTORTION
d Line
g Line
C Line
F Line
e Line
— S
-- M

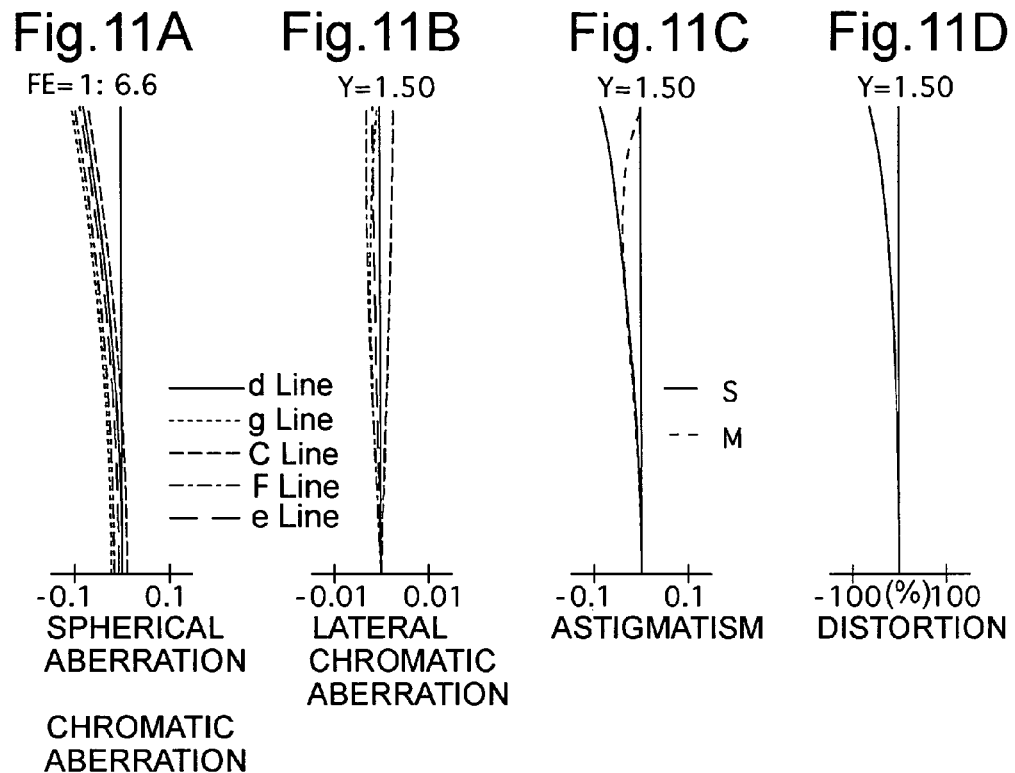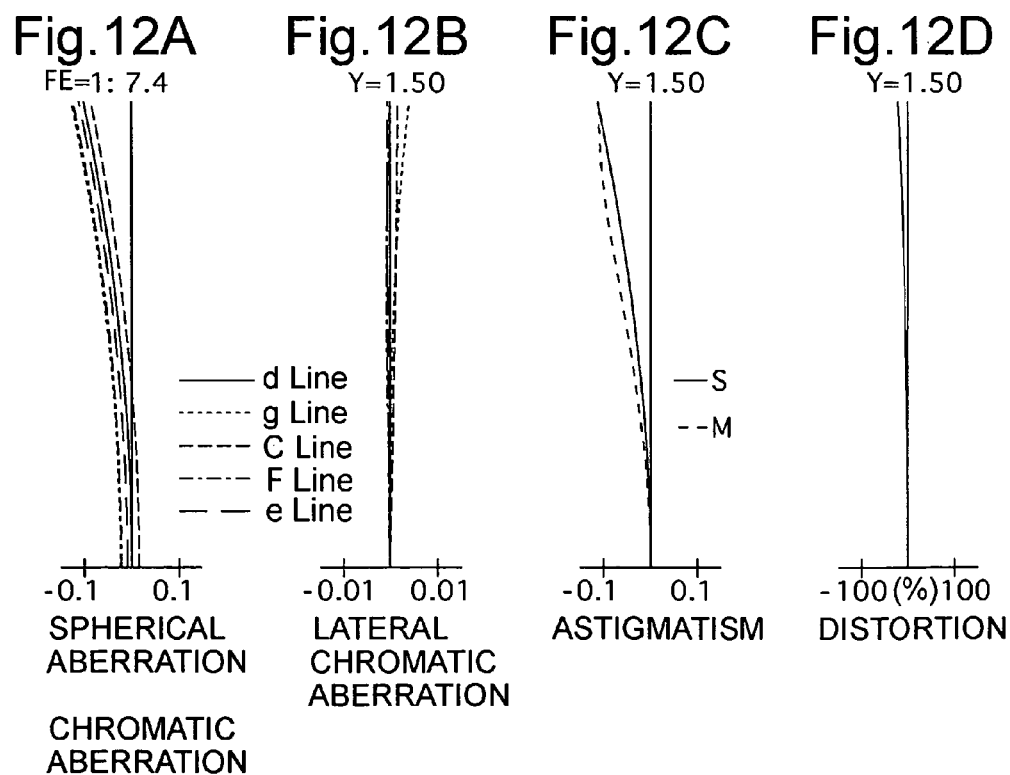

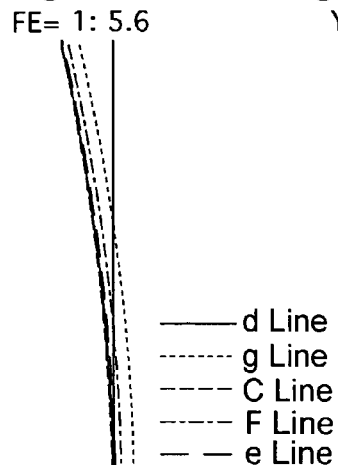
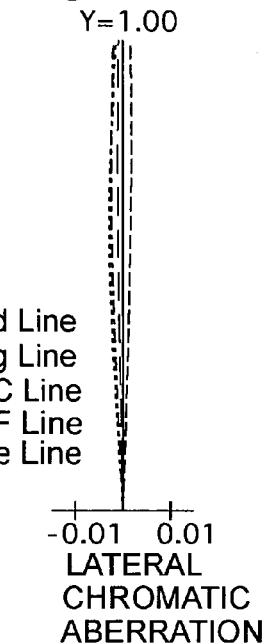
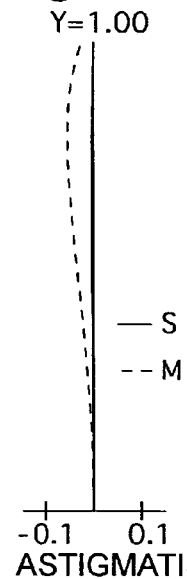
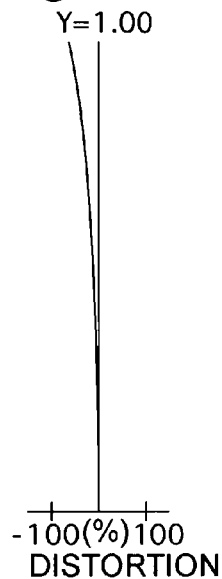
Fig.15A  FE= 1: 5.6
SPHERICAL ABERRATION
CHROMATIC ABERRATION
Fig.15B  Y=1.00
LATERAL CHROMATIC ABERRATION
Fig.15C  Y=1.00
ASTIGMATISM
Fig.15D  Y=1.00
DISTORTION
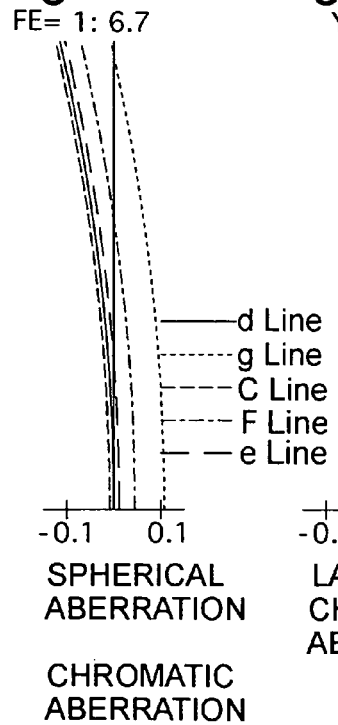
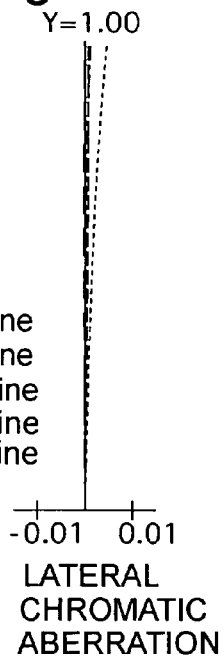
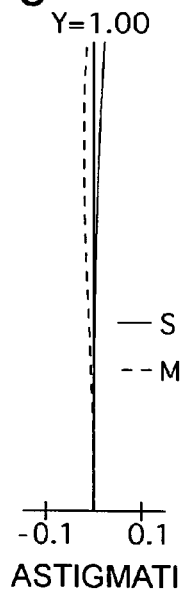
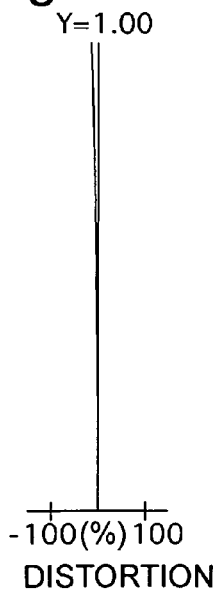
Fig.16A  FE= 1: 6.7
SPHERICAL ABERRATION
CHROMATIC ABERRATION
Fig.16B  Y=1.00
LATERAL CHROMATIC ABERRATION
Fig.16C  Y=1.00
ASTIGMATISM
Fig.16D  Y=1.00
DISTORTION

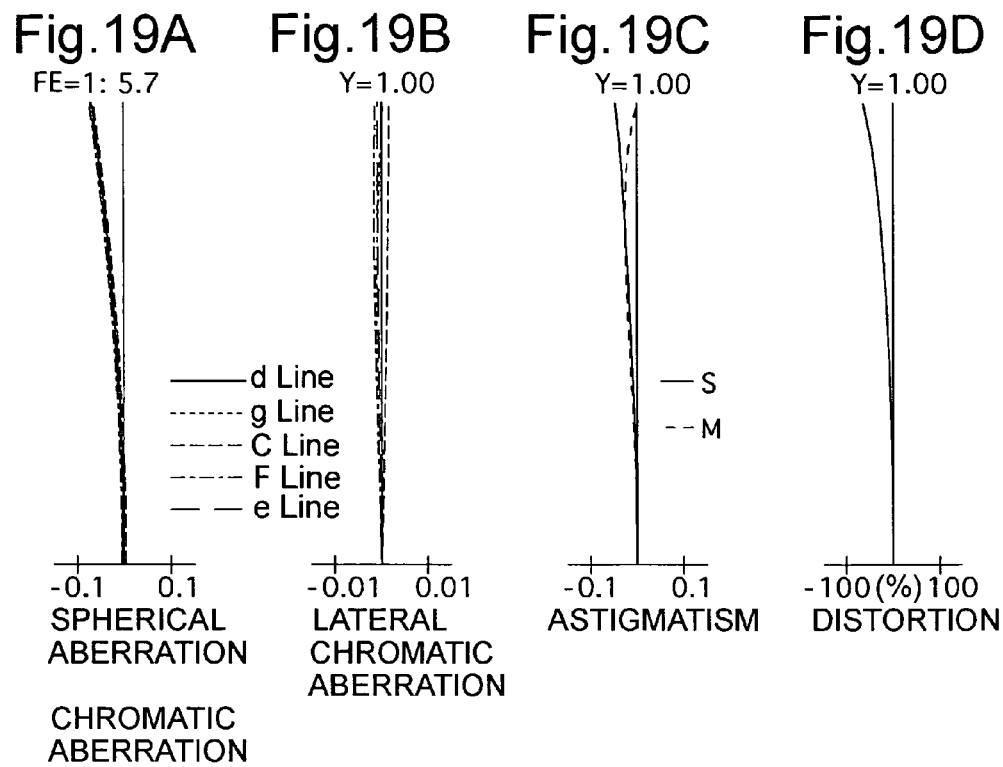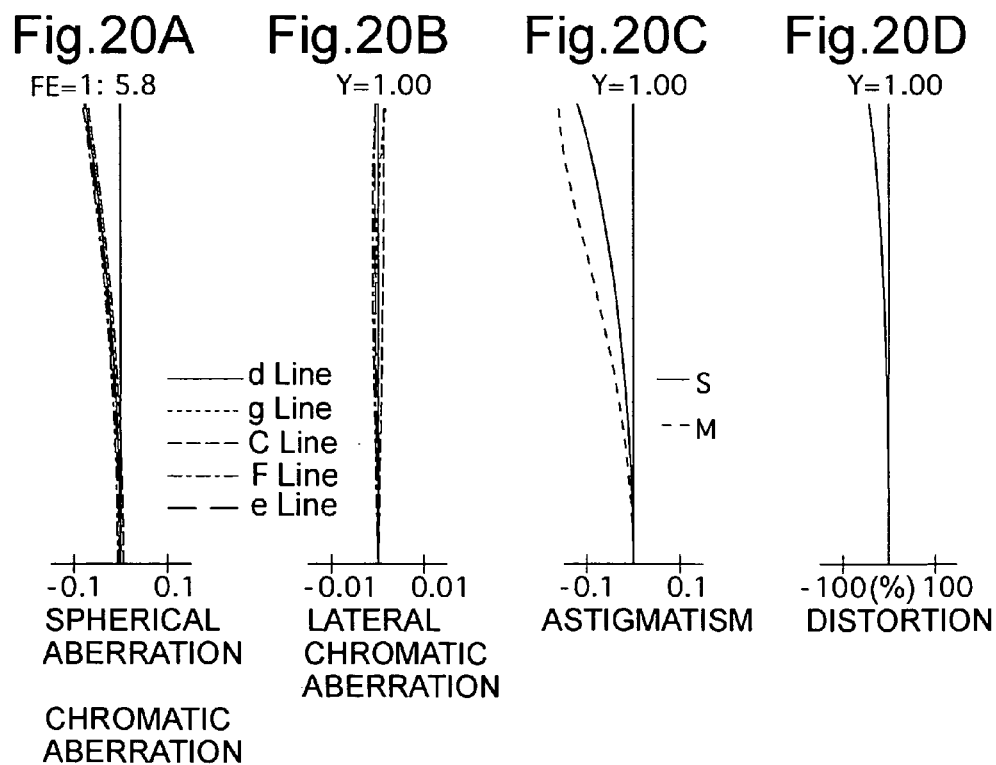

FE= 1: 6.6

Y=1.50

Y=1.50

Y=1.50

———— d Line
········· g Line
- - - - C Line
-·-·- F Line
— — e Line

—— S
- - M

-0.1   0.1
SPHERICAL
ABERRATION
CHROMATIC
ABERRATION

-0.01  0.01
LATERAL
CHROMATIC
ABERRATION

-0.1   0.1
ASTIGMATISM

-100 (%) 100
DISTORTION

FE= 1: 8.3

Y=1.50

Y=1.50

Y=1.50

———— d Line
········· g Line
- - - - C Line
-·-·- F Line
— — e Line

—— S
- - M

-0.1   0.1
SPHERICAL
ABERRATION
CHROMATIC
ABERRATION

-0.01  0.01
LATERAL
CHROMATIC
ABERRATION

-0.1   0.1
ASTIGMATISM

-100(%) 100
DISTORTION

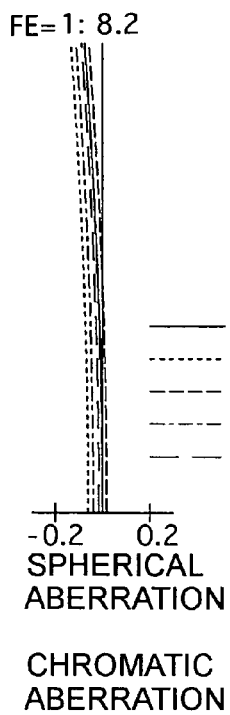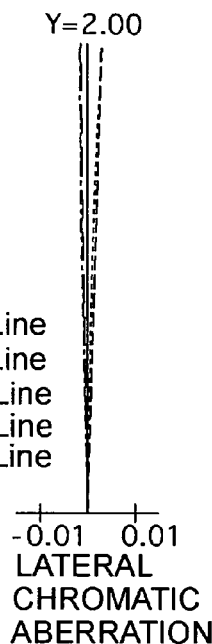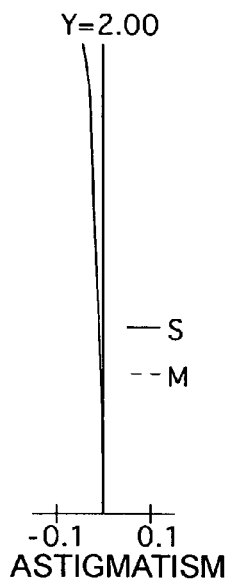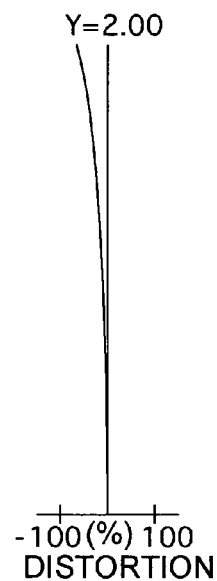
Fig.27A
FE=1: 8.2
Fig.27B
Y=2.00
Fig.27C
Y=2.00
Fig.27D
Y=2.00
— d Line
······ g Line
— — C Line
—·— F Line
— — e Line
-0.2  0.2
SPHERICAL
ABERRATION
CHROMATIC
ABERRATION
-0.01  0.01
LATERAL
CHROMATIC
ABERRATION
— S
— — M
-0.1  0.1
ASTIGMATISM
-100(%) 100
DISTORTION
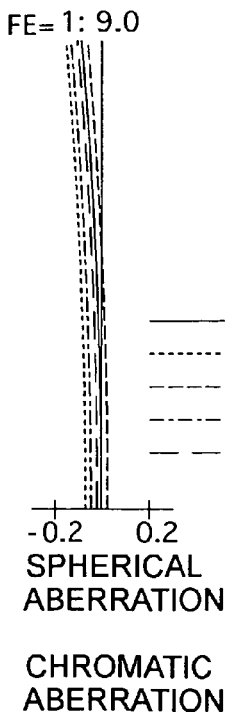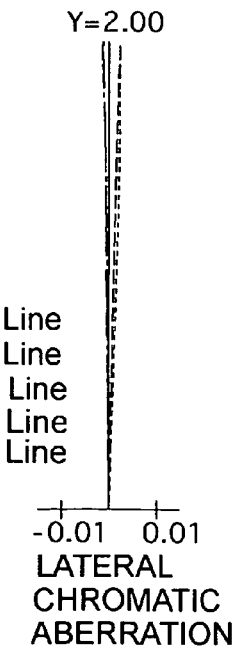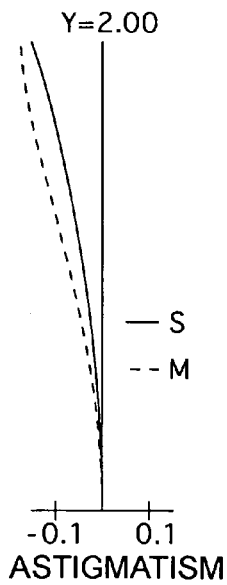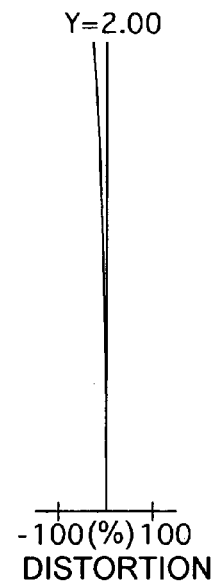
Fig.28A
FE=1: 9.0
Fig.28B
Y=2.00
Fig.28C
Y=2.00
Fig.28D
Y=2.00
— d Line
······ g Line
— — C Line
—·— F Line
— — e Line
-0.2  0.2
SPHERICAL
ABERRATION
CHROMATIC
ABERRATION
-0.01  0.01
LATERAL
CHROMATIC
ABERRATION
— S
— — M
-0.1  0.1
ASTIGMATISM
-100(%) 100
DISTORTION

IMAGING-OPTICAL SYSTEM

BACKGROUND OF THE INVENTION

1. Field of the Invention

The present invention relates to an imaging-optical system in which zooming is performed by moving at least one lens group thereof without varying a distance from the most object-side surface of the first lens group to the imaging plane. With the above arrangement, the imaging-optical system enables both normal viewing with a lower magnification ratio at the short focal length extremity and magnified viewing at the maximum magnification position.

2. Description of the Prior Art

As an imaging-optical system which enables both normal viewing and magnified viewing, an endoscope viewing-optical system in which at least one lens group is moved to perform zooming has been known in the art, as disclosed in, e.g., Japanese Unexamined Patent Publication (JUPP) No. Hei-11-295596.

More specifically, in JUPP No. Hei-11-295596, an imaging device and at least one lens group are made movable; however, due to this arrangement, a signal processor board and cables have to be connected to the imaging device such as a CCD, so that a strong driving force is required in order to move the imaging device. In the case where the imaging device is driven by an actuator or a motor, it becomes especially significant to reduce the amount of load from the driven components (the imaging device and at least one lens group). Accordingly, it is desirable to maintain the CCD (imaging device) stationary regardless of a zooming operation.

In addition, JUPP No. 2001-166203 and JUPP No. 2001-91832 are taken as examples of prior art in which a plurality of lens groups are moved in order to perform zooming:

JUPP No. 2001-166203 has disclosed an optical system of a three-lens-group arrangement, i.e., a first lens group having a negative refractive power (hereinafter, a negative first lens group), a second lens group having a positive refractive power (hereinafter, a positive second lens group) and a third lens group having a positive refractive power (hereinafter, a positive third lens group) in this order from the object. The positive second lens group and the positive third lens group are moved to perform zooming. However, field curvature (astigmatism) and lateral chromatic aberration are extremely larger at magnified viewing; and JUPP No. 2001-91832 has disclosed an optical system of a four-lens-group arrangement, i.e., a negative fist lens group, a positive second lens group, a negative third lens group and a fourth lens group having a positive refractive power (hereinafter, a positive fourth lens group) in this order from the object. The negative third lens group and the positive second lens group or the positive fourth lens group are moved to perform zooming. However, a refractive power (hereinafter, power) of the negative third lens group is strong, so that the number of lens elements for the correcting of aberrations becomes larger. Consequently, the overall length of the optical system becomes longer.

In addition, it has been known that a retrofocus-type optical system, which has a smaller number of lens elements, has been used in an endoscope. However, there is a large change in optical performance between normal viewing and magnified viewing. In particular, lateral chromatic aberration largely varies between normal viewing and magnified viewing; and similarly, astigmatism largely varies therebetween. Therefore it is difficult to balance lateral chromatic aberration and astigmatism at normal viewing and magnified viewing. For example, if lateral chromatic aberration is suitably corrected at normal viewing, the same at magnified viewing is overcorrected; while, if lateral chromatic aberration is suitably corrected at magnified viewing, the same at normal viewing is undercorrected. Namely, if the correcting of aberration is suitable made at one of normal viewing and magnified viewing, resolution of an image at the other of normal viewing and magnified viewing deteriorates, or vice versa.

In recent years, higher picture quality with a larger number of pixels has been desired due to the further development of CCDs.

Accordingly, the size of each single CCD-pixel has become smaller; and an objective optical system has been required to have higher optical performance at both normal viewing and magnified viewing.

SUMMARY OF THE INVENTION

The present invention provides an imaging-optical system which (i) includes a three-lens-group arrangement of a negative first lens group, a positive second lens group and a positive third lens group, in this order from the object, and (ii) is arranged to perform zooming by moving the positive second lens group and the positive third lens group while (ii-1) an object distance is being varied, (ii-2) an in-focus state of the imaging-optical system is maintained, and (ii-3) a distance from the most object-side surface of the negative first lens group to the imaging plane is not varied.

With the above arrangement, both normal viewing at the short focal length extremity and magnified viewing at the maximum magnification position can be carried out while aberrations, particularly lateral chromatic aberration and astigmatism, are suitably corrected; and the imaging-optical system can be miniaturized.

According to an aspect of the present invention, there is provided an imaging-optical system including a negative first lens group, a positive second lens group and a positive third lens group, in this order from the object.

A zooming operation is performed by moving the positive second lens group and the positive third lens group while an object distance to the object is being varied without varying a distance from the most object-side surface of the negative first lens group to the imaging plane.

An in-focus state of the imaging-optical system is maintained while the focal length of the imaging-optical system is being varied through the zooming operation.

The negative first lens group includes cemented lens elements; and the cemented lens elements are positioned at the most object-side of the negative first lens group, and satisfy the following condition:

$$0.9 < Ra/fw < 2.0 \tag{1}$$

wherein

Ra designates the radius of curvature of a bonding surface of the cemented lens elements of the negative first lens group; and fw designates the focal length of the imaging-optical system at the short focal length extremity.

According to another aspect of the present invention, there is provided an imaging-optical system including a negative first lens group, a positive second lens group and a positive third lens group, in this order from the object.

A zooming operation is performed by moving the positive second lens group and the positive third lens group while an object distance to the object is being varied without varying a distance from the most object-side surface of the negative first lens group to the imaging plane.

An in-focus state of the imaging-optical system is maintained while the focal length of the imaging-optical system is being varied through the zooming operation.

The negative first lens group includes cemented lens elements; and the cemented lens elements are positioned at the most object-side of the negative first lens group, and satisfy the following condition:

$$-1.1 < Ra/f1 < -0.5 \quad (2)$$

wherein

Ra designates the radius of curvature of the bonding surface of the cemented lens elements of the negative first lens group; and f1 designates the focal length of the negative first lens group.

The imaging-optical system according to the present invention preferably satisfies the following condition:

$$0.6 < Ra/ft < 2.0 \quad (3)$$

wherein

Ra designates the radius of curvature of the bonding surface of the cemented lens elements of the negative first lens group; and ft designates the focal length of the imaging-optical system at the maximum magnification position.

The imaging-optical system according to the present invention can satisfy the following conditions:

$$v12 < 30 \quad (4)$$

$$n11 > 1.8 \quad (5)$$

wherein v12 designates the Abbe number of an image-side lens element of the cemented lens elements of the negative first lens group; and n11 designates the refractive index of an object-side lens element of the cemented lens elements the negative first lens group.

The negative first lens group can be constituted only by cemented lens elements having a negative refractive power. Due to this arrangement, the structure of the negative first lens group can be simplified.

The negative first lens group and the positive third lens group of the imaging-optical system according to the present invention preferably satisfy the following conditions:

$$-3.0 < f1/fw < -1.5 \quad (6)$$

$$2 < f3/fw < 3 \quad (7)$$

wherein f1 designates the focal length of the negative first lens group;

f3 designates the focal length of the positive third lens group; and fw designates the focal length of the imaging-optical system at the short focal length extremity.

The positive third lens group preferably includes cemented lens elements constituted by a negative lens element and a positive lens element which satisfy the following conditions:

$$1.2 < |Rb|/fw < 2.5 \quad (8)$$

$$0.8 < |Rb|/ft < 2.3 \quad (9)$$

wherein

Rb designates the radius of curvature of a bonding surface of the cemented lens elements of the positive third lens group;

fw designates the focal length of the imaging-optical system at the short focal length extremity; and ft designates the focal length of the imaging-optical system at the maximum magnification position.

The present disclosure relates to subject matter contained in Japanese Patent Application No. 2004-67664 (filed on Mar. 10, 2004) which is expressly incorporated herein in its entirety.

BRIEF DESCRIPTION OF THE DRAWINGS

The present invention will be discussed below in detail with reference to the accompanying drawings, in which:

FIGS. 3A, 3B, 3C and 3D show aberrations occurred in the lens arrangement shown in FIG. 1;

FIGS. 4A, 4B, 4C and 4D show aberrations occurred in the lens arrangement shown in FIG. 2;

FIGS. 7A, 7B, 7C and 7D show aberrations occurred in the lens arrangement shown in FIG. 5;

FIGS. 8A, 8B, 8C and 8D show aberrations occurred in the lens arrangement shown in FIG. 6;

FIGS. 11A, 11B, 11C and 11D show aberrations occurred in the lens arrangement shown in FIG. 9;

FIGS. 12A, 12B, 12C and 12D show aberrations occurred in the lens arrangement shown in FIG. 10;

FIGS. 15A, 15B, 15C and 15D show aberrations occurred in the lens arrangement shown in FIG. 13;

FIGS. 16A, 16B, 16C and 16D show aberrations occurred in the lens arrangement shown in FIG. 14;

FIGS. 19A, 19B, 19C and 19D show aberrations occurred in the lens arrangement shown in FIG. 17;

FIGS. 20A, 20B, 20C and 20D show aberrations occurred in the lens arrangement shown in FIG. 18;

FIGS. 27A, 27B, 27C and 27D show aberrations occurred in the lens arrangement shown in FIG. 25; and FIGS. 28A, 28B, 28C and 28D show aberrations occurred in the lens arrangement shown in FIG. 26.

DESCRIPTION OF THE PREFERRED EMBODIMENTS

According to the first through seventh embodiments of the present invention, the imaging-optical system includes a negative first lens group 10, a diaphragm S, a positive second lens group 20, and a positive third lens group 30, in this order from the object. A cover glass (filter group) C is provided in front of a CCD (imaging device) behind the third lens group 30. The letter 'I' designates the imaging plane.

Throughout the embodiments, the operation of the imaging-optical system is the same. Here, how the lens groups are moved will be explained with FIGS. 1 and 2 (the first embodiment).

Figure 1:
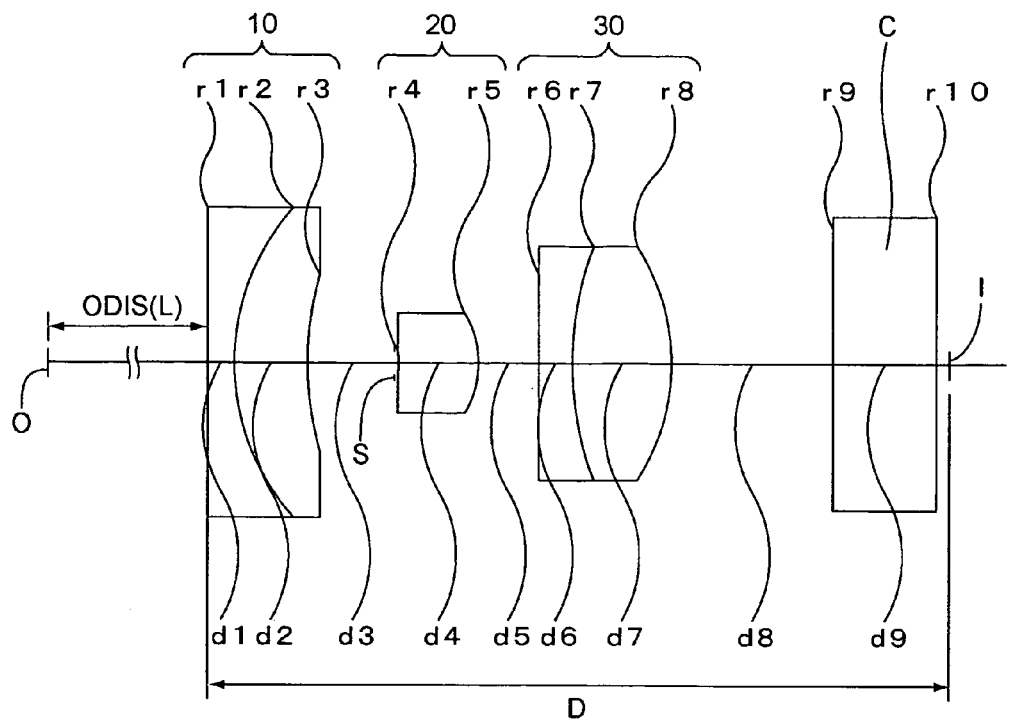
FIG. 1 is a lens arrangement of an imaging-optical system at normal viewing, according to a first embodiment of the present invention.

FIG. 1 is the lens arrangement of the imaging-optical system at normal viewing (the short focal length extremity), and an in-focus state is obtained with respect to an object 'O' at an object distance of ODIS (L).

From this state, if an attempt is made to perform magnified viewing at the maximum magnification position of the imaging-optical system, a photographer holding the imaging-optical system is approaching the object 'O' to make the distance between the imaging-optical system and the object 'O' shorter while the positive second lens group 20 and the positive third lens group 30 are being respectively moved toward the object without varying the distance from the most object-side surface of the negative first lens group 10 to the imaging plane 'I'.

Figure 2:
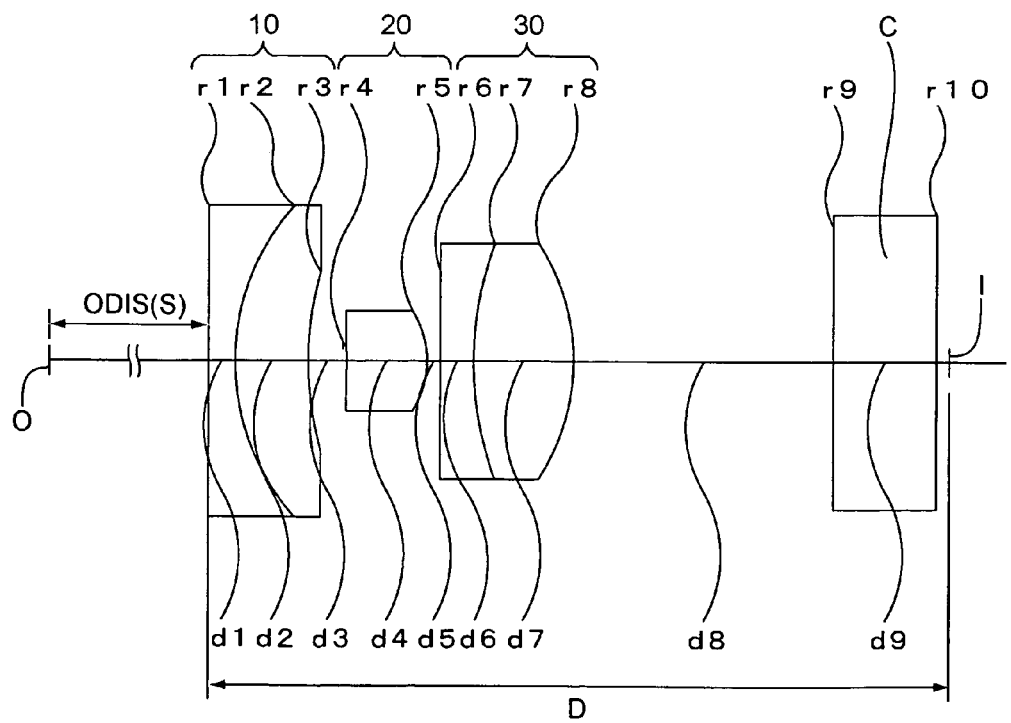
FIG. 2 is a lens arrangement of the imaging-optical system at magnified viewing, according to the first embodiment of the present invention.

Then, the imaging-optical system is changed to the state of FIG. 2 where the object 'O' at the object distance ODIS (S), which is shorter than ODIS (L), is magnified with the maximum magnification ratio.

The diaphragm S moves together with the positive second lens group 20.

In the negative first lens group 10, cemented lens elements are provided at the most object-side thereof, which will be more specifically explained as follows:

(i) In the first to third, fifth and sixth embodiments, the negative first lens group 10 is constituted only by the cemented lens elements having a negative lens element and a positive lens element, in this order from the object.

(ii) In the fourth embodiment, the negative first lens group 10 is constituted only by the cemented lens elements having a negative lens element and the other negative lens element, in this order from the object.

(iii) In the seventh embodiment, the negative first lens group 10 is constituted by the cemented lens elements having a negative lens element and a positive lens element, and a negative single lens element, in this order from the object.

A feature of the present invention is to provide, at the most object-side of the negative first lens group 10, the cemented lens elements constituted by the combination of a negative lens element and a positive lens element or that of a negative lens element and the other negative lens element in this order from the object.

In a general optical-design practice, an attempt has been made to employ a plurality of lens elements to reduce lateral chromatic aberration.

However, in the case of the objective lens system of an endoscope where the first lens group has a strong power, if cemented lens elements having a negative lens element and a positive lens element are provided at a position other than the most object-side of the first lens group as disclosed in JUPP No. 2001-166203, the radius of curvature of the image-side surface of the most object-side negative lens element has to be made smaller, i.e., the power thereof becomes extremely stronger. Consequently, the incident light rays are largely (sharply) refracted by the most object-side negative lens element (the negative first lens element), so that astigmatism and coma largely occur. As a result, the correcting of aberrations becomes difficult over the entire zooming range, i.e., from the magnification for normal-viewing through to that of magnified viewing.

Unlike the above-explained prior art, according to the present invention, the cemented lens elements are provided at the most object-side of the negative first lens group 10 so that (i) at normal viewing, a smaller amount of lateral chromatic aberration occurs at the bonding surface of the cemented lens elements, and (ii) at magnified viewing, a larger amount of lateral chromatic aberration occurs thereat. As a result, lateral chromatic aberration over the entire imaging-optical system can be prevented from being undercorrected at normal viewing, or from being overcorrected at magnified viewing, i.e., lateral chromatic aberration can be suitably corrected at both normal viewing and magnified viewing, and at the same time, astigmatism and coma can be reduced.

Condition (1) specifies the ratio of the radius of curvature of the bonding surface of the cemented lens elements of the negative first lens group 10 to the focal length of the entire imaging-optical system at the short focal length extremity.

If Ra/fw exceeds the upper limit of condition (1), lateral chromatic aberration at normal viewing becomes undercorrected, or overcorrected at magnified viewing.

If Ra/fw exceeds the lower limit of condition (1), lateral chromatic aberration is overcorrected, and coma largely occurs. Consequently, the resolution of the imaging-optical system deteriorates.

A more desirable optical performance can be achieved, if the imaging-optical system satisfies the following condition:

$$0.9 < Ra/fw < 1.7 \qquad (1')$$

Condition (2) specifies the ratio of the radius of curvature of the bonding surface of the cemented lens elements of the negative first lens group 10 to the focal length of the negative first lens group 10.

If Ra/f1 exceeds the upper limit of condition (2), lateral chromatic aberration at normal viewing becomes undercorrected, or overcorrected at magnified viewing.

If Ra/f1 exceeds the lower limit of condition (2), lateral chromatic aberration is overcorrected, and coma largely occurs. Consequently, the resolution of the imaging-optical system deteriorates.

Condition (3), similar to condition (1), specifies the ratio of the radius of curvature of the bonding surface of the cemented lens elements of the negative first lens group 10 to the focal length of the entire imaging-optical system at the maximum magnification position. In the case of the present invention, note that the long focal length extremity may not coincide with the maximum magnification position, because zooming is performed while an object distance to the object is being varied. In other words, the term 'maximum magnification position' does not simply indicate the long focal length extremity only.

In the imaging-optical system of the present invention, the distance from the most object-side surface of the negative first lens group 10 to the imaging plane 'I' is not varied. Therefore the focal length of the imaging-optical system at the maximum magnification position defined as a focal length when (i) the positive second lens group 20 and the positive third lens group 30 are set at a position for magnified viewing, and (ii) an in-focus state is obtained with respect to the object 'O' at a predetermined object distance, i.e., the distance from the most object-side surface of the negative first lens group 10 to the object 'O'.

If Ra/ft exceeds the upper limit of condition (3), lateral chromatic aberration at normal viewing becomes undercorrected, or overcorrected at magnified viewing.

If Ra/ft exceeds the lower limit of condition (3), lateral chromatic aberration is overcorrected, and coma largely occurs. Consequently, the resolution of the imaging-optical system deteriorates.

A more desirable optical performance can be achieved, if the imaging-optical system satisfies the following condition:

$$0.6 < Ra/ft < 1.5 \quad (3')$$

The cemented lens elements of the negative first lens group 10 preferably satisfy conditions (4) and (5). Namely, it is desirable to use a high dispersion glass material for the image-side lens element of the cemented lens elements, and to use high-refractive glass for the object-side lens element thereof (the most object-side lens element of the imaging-optical system).

If v12 exceeds the upper limit of condition (4), or if n11 exceeds the lower limit of condition (5), lateral chromatic aberration at normal viewing becomes undercorrected, or overcorrected at magnified viewing, and coma largely occurs. Furthermore, since the radius of curvature becomes smaller, machining of the lens element becomes difficult.

In order to make the length of the imaging-optical system shorter, and to make the diameter of the lens groups smaller, condition (6) is preferably satisfied with respect to the focal length of negative first lens group 10.

Condition (6) specifies ratio of the focal length of the negative first lens group to the focal length of the entire imaging-optical system at the short focal length extremity.

If f1/fw exceeds the lower limit of condition (6), the diameter of the lens groups becomes larger when an attempt is made to attain a larger angle-of-view at normal viewing; and, field curvature becomes larger at magnified viewing.

If f1/fw exceeds the upper limit of condition (6), the magnification of the negative first lens group 10 becomes smaller. Accordingly, in order to achieve a lager magnification of the entire imaging-optical system at magnified viewing, the focal length of the positive second lens group 20 and that of the positive third lens group 30 have to be made longer. As a result, the size of the imaging-optical system becomes larger. Furthermore, astigmatism and coma occurred in the negative first lens group 10 become larger, so that the correcting of these aberrations (astigmatism and coma) by other lens groups becomes difficult.

Condition (7) specifies the focal length of the positive third lens group 30.

If f3/fw exceeds the lower limit of condition (7), aberrations deteriorate, in particular, astigmatism at magnified viewing becomes larger, so that the resolution of the imaging-optical system deteriorates.

If f3/fw exceeds the upper limit of condition (7), the focal length of the positive second lens group 20 has to be made shorter so that a wider angle-of-view is maintained at normal viewing. Therefore if an attempt is made to make the magnification of the entire imaging-optical system at magnified viewing larger, the traveling distance of the positive second lens group 20 and that of the positive third lens group 30 have to be made longer. Consequently; the entire imaging-optical system has to be made longer, or, the diameter of the lens groups becomes larger since the power of the negative first lens group 10 becomes weaker.

The positive third lens group 30 is preferably constituted by the cemented lens elements having a positive lens element and a negative lens element (in any order from the object).

Conditions (8) and (9) specifies the radius of curvature of the bonding surface of the cemented lens elements of the positive third lens group 30.

If |Rb|/fw exceeds the upper limit of condition (8), lateral chromatic aberration becomes undercorrected.

If |Rb|/ft exceeds the upper limit of condition (9), lateral chromatic aberration becomes undercorrected.

If |Rb|/fw exceeds the lower limit of condition (8), lateral chromatic aberration is overcorrected, and coma largely occurs. Consequently, the resolution of the imaging-optical system deteriorates.

If |Rb|/ft exceeds the lower limit of condition (9), lateral chromatic aberration is overcorrected, and coma largely occurs. Consequently, the resolution of the imaging-optical system deteriorates.

As discussed above, according the present invention, the imaging-optical system can be constituted by the three-lens-group arrangement with a smaller number of lens elements. Due to this arrangement, an endoscope, which enables magnified viewing without complicating the structure of the distal end portion thereof nor increasing the size thereof, can be obtained.

Specific numerical data of the embodiments will be described hereinafter.

In the diagrams of chromatic aberration (axial chromatic aberration) represented by spherical aberration, the solid line and the four types of dotted lines respectively indicate spherical aberrations with respect to the d, g, C, F and e lines.

Also, in the diagrams of lateral chromatic aberration, the four types of dotted lines respectively indicate magnification with respect to the g, C, F and e lines; however, the d line as the base line coincides with the ordinate.

In the diagrams of astigmatism, S designates the sagittal image, and M designates the meridional image.

Throughout the diagrams, Y designates the image height, and FE designates the effective f-number.

In the tables, FE designates the effective f-number, f designates the focal length of the entire imaging-optical system, M designates the lateral magnification of the entire imaging-optical system, fB designates the back focal distance, r designates the radius of curvature, d designates the lens-element thickness or distance between lens elements, $N_d$ designates the refractive index of the d-line, and $v_d$ designates the Abbe number.

Embodiment 1

FIG. 1 is the lens arrangement of the imaging-optical system at normal viewing. FIG. 2 is the lens arrangement of the imaging-optical system at magnified viewing. FIGS. 3A through 3D show aberrations occurred in the lens arrangement shown in FIG. 1. FIGS. 4A through 4D show aberrations occurred in the lens arrangement shown in FIG. 2.

Table 1 shows the numerical values of the first embodiment. The values which change between normal viewing and magnified viewing are indicated in this order of the terms.

The imaging-optical system includes the negative first lens group 10 constituted by the cemented lens elements having a negative lens element and a positive lens element in this order from the object, the diaphragm S, the positive second lens group 20 constituted by a single lens element, and the positive third lens group 30 constituted by the cemented lens elements having a negative lens element and a positive lens element in this order from the object.

The cover glass C (filter group) is provided in front of a CCD (imaging device).

The diaphragm S is 1.258 behind surface No. 3 at normal viewing, and is 0.499 behind surface No. 3 at magnified viewing.

TABLE 1

FE = 1:8.1–9.1
f = 2.16–2.34
M = −0.167—−0.678
fB = 0.05

| Surf. No. | r | d | $N_d$ | $v_d$ |
|---|---|---|---|---|
| 1 | ∞ | 0.384 | 1.88300 | 40.8 |
| 2 | 3.456 | 1.046 | 1.92286 | 18.9 |
| 3 | 4.800 | 1.315–0.557 | | |
| 4 | −1.797 | 1.152 | 1.69400 | 56.3 |
| 5 | −1.409 | 0.864–0.192 | | |
| 6 | ∞ | 0.480 | 1.92286 | 18.9 |
| 7 | 4.865 | 1.440 | 1.77250 | 49.6 |
| 8 | −3.168 | 2.319–3.749 | | |
| 9 | ∞ | 1.500 | 1.51633 | 64.1 |
| 10 | ∞ | — | | |

Embodiment 2

Figure 5:
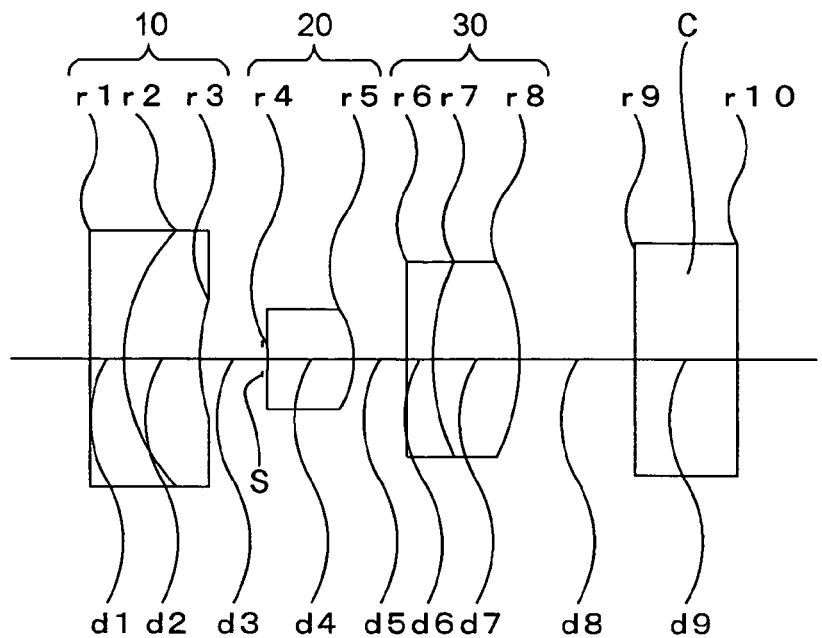
FIG. 5 is a lens arrangement of the imaging-optical system at normal viewing, according to a second embodiment of the present invention.
Figure 6:
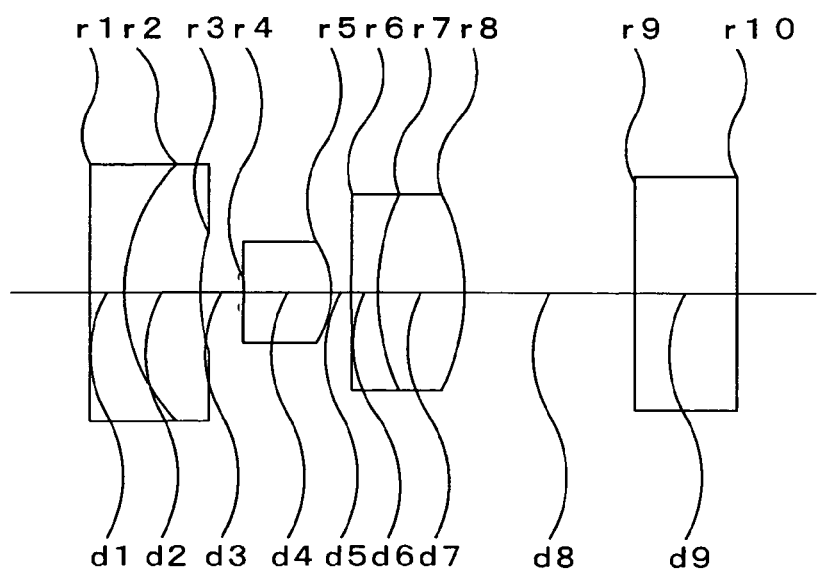
FIG. 6 is a lens arrangement of the imaging-optical system at magnified viewing, according to the second embodiment of the present invention.

FIG. 5 is the lens arrangement of the imaging-optical system at normal viewing. FIG. 6 is the lens arrangement of the imaging-optical system at magnified viewing.

The basic lens arrangement is the same as that of the first embodiment.

FIGS. 7A through 7D show aberrations occurred in the lens arrangement shown in FIG. 5. FIGS. 8A through 8D show aberrations occurred in the lens arrangement shown in FIG. 6.

Table 2 shows the numerical values of the second embodiment. The values which change between normal viewing and magnified viewing are indicated in this order of the terms.

The diaphragm S is 0.798 behind surface No. 3 at normal viewing, and is 0.503 behind surface No. 3 at magnified viewing.

TABLE 2

FE = 1:6.6–6.9
f = 1.61–1.68
M = −0.112—−0.410
fB = 0.05

| Surf. No. | r | d | $N_d$ | $v_d$ |
|---|---|---|---|---|
| 1 | ∞ | 0.440 | 1.88300 | 40.8 |
| 2 | 2.357 | 0.981 | 1.92286 | 18.9 |
| 3 | 2.564 | 0.864–0.569 | | |
| 4 | −2.062 | 1.100 | 1.77250 | 49.6 |
| 5 | −1.220 | 0.664–0.263 | | |
| 6 | 105.409 | 0.330 | 1.92286 | 18.9 |
| 7 | 3.142 | 1.101 | 1.77250 | 49.6 |
| 8 | −2.885 | 1.471–2.167 | | |
| 9 | ∞ | 1.300 | 1.51633 | 64.1 |
| 10 | ∞ | — | | |

Embodiment 3

Figure 9:
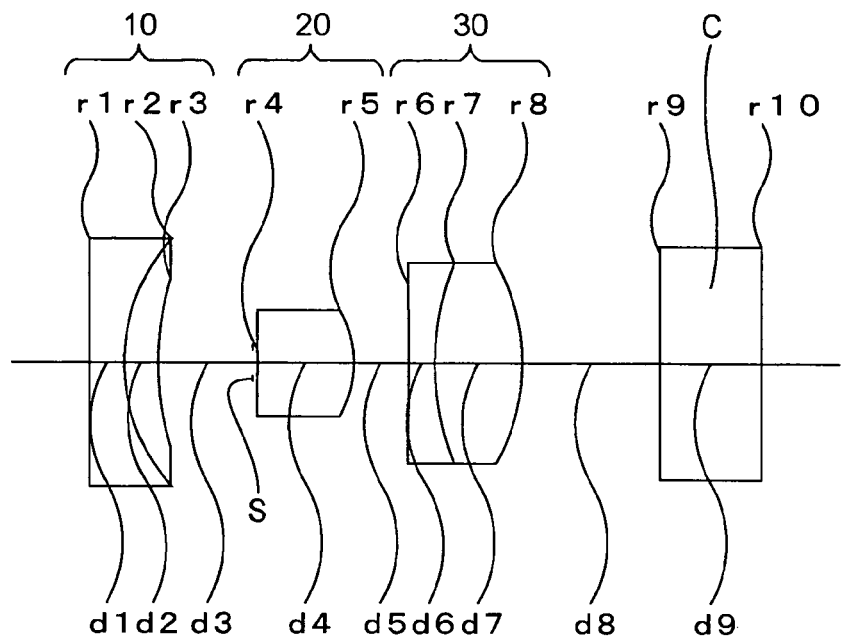
FIG. 9 is a lens arrangement of the imaging-optical system at normal viewing, according to a third embodiment of the present invention.
Figure 10:
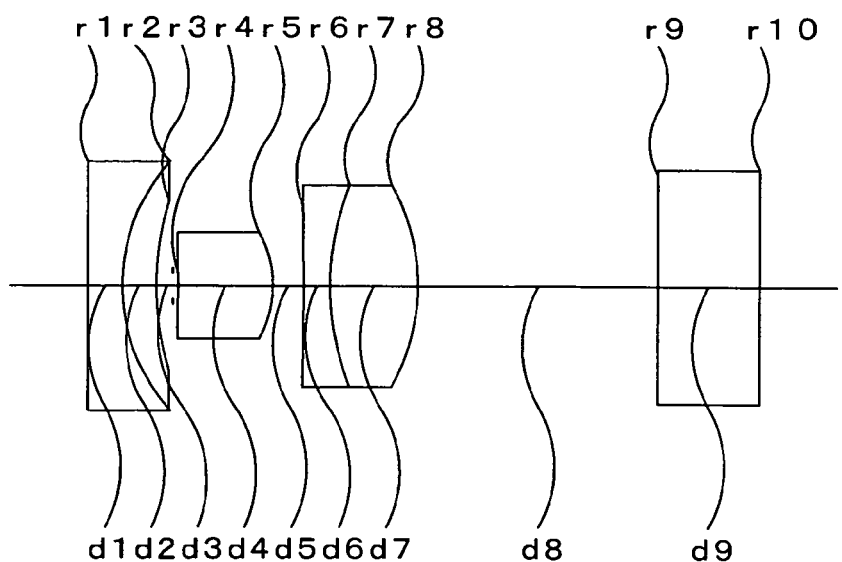
FIG. 10 is a lens arrangement of the imaging-optical system at magnified viewing, according to the third embodiment of the present invention.

FIG. 9 is the lens arrangement of the imaging-optical system at normal viewing. FIG. 10 is the lens arrangement of the imaging-optical system at magnified viewing.

The basic lens arrangement is the same as that of the first embodiment.

FIGS. 11A through 11D show aberrations occurred in the lens arrangement shown in FIG. 9. FIGS. 12A through 12D show aberrations occurred in the lens arrangement shown in FIG. 10.

Table 3 shows the numerical values of the third embodiment. The values which change between normal viewing and magnified viewing are indicated in this order of the terms.

The diaphragm S is 1.215 behind surface No. 3 at normal viewing, and is 0.218 behind surface No. 3 at magnified viewing.

TABLE 3

FE = 1:6.6–7.4
f = 1.62–1.96
M = −0.133—−0.650
fB = 0.05

| Surf. No. | r | d | $N_d$ | $v_d$ |
|---|---|---|---|---|
| 1 | ∞ | 0.440 | 1.88300 | 40.8 |
| 2 | 2.373 | 0.440 | 1.92286 | 18.9 |
| 3 | 3.600 | 1.281–0.284 | | |
| 4 | −1.738 | 1.216 | 1.88300 | 40.8 |
| 5 | −1.402 | 0.688–0.393 | | |
| 6 | −50.399 | 0.330 | 1.92286 | 18.9 |
| 7 | 3.559 | 1.106 | 1.77250 | 49.6 |
| 8 | −2.722 | 1.771–3.063 | | |
| 9 | ∞ | 1.300 | 1.51633 | 64.1 |
| 10 | ∞ | — | | |

Embodiment 4

Figure 13:
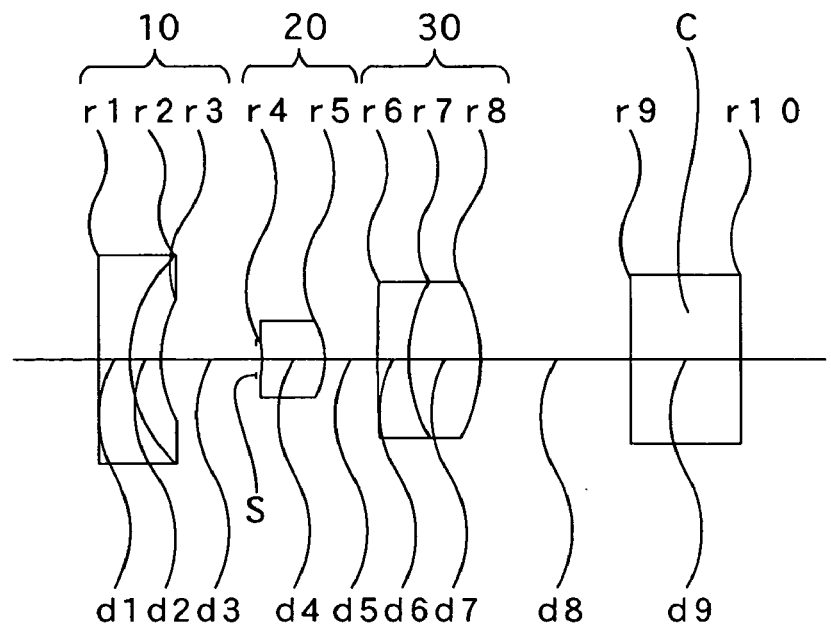
FIG. 13 is a lens arrangement of the imaging-optical system at normal viewing, according to a fourth embodiment of the present invention.
Figure 14:
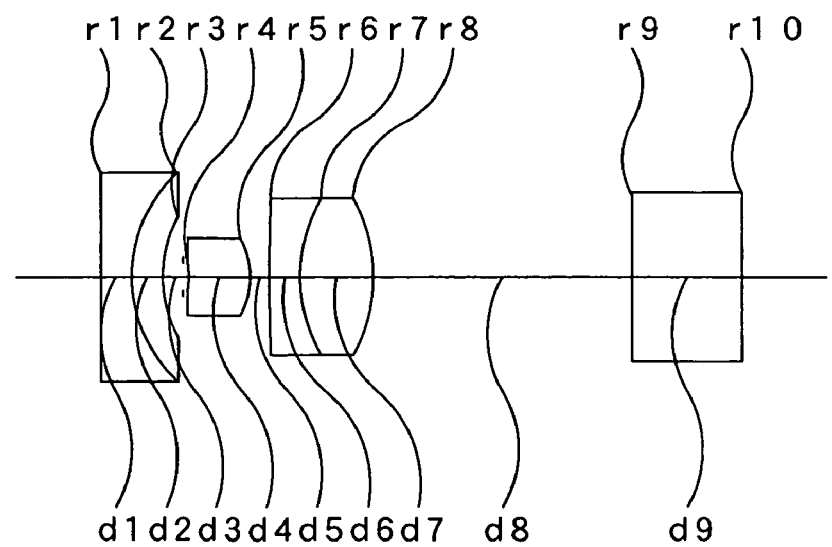
FIG. 14 is a lens arrangement of the imaging-optical system at magnified viewing, according to the fourth embodiment of the present invention.

FIG. 13 is the lens arrangement of the imaging-optical system at normal viewing. FIG. 14 is the lens arrangement of the imaging-optical system at magnified viewing.

The basic lens arrangement is the same as that of the first embodiment except that the negative first lens group 10 is constituted by the cemented lens elements having the negative lens element and the other negative lens element.

FIGS. 15A through 15D show aberrations occurred in the lens arrangement shown in FIG. 13. FIGS. 16A through 16D show aberrations occurred in the lens arrangement shown in FIG. 14.

Table 4 shows the numerical values of the fourth embodiment. The values which change between normal viewing and magnified viewing are indicated in this order of the terms.

The diaphragm S is 1.146 behind surface No. 3 at normal viewing, and is 0.244 behind surface No. 3 at magnified viewing.

TABLE 4

FE = 1:5.6–6.7
f = 1.06–1.66
M = −0.080−−0.500
fB = 0.05

| Surf. No. | r | d | $N_d$ | $\nu_d$ |
|---|---|---|---|---|
| 1 | ∞ | 0.369 | 1.88300 | 40.8 |
| 2 | 1.715 | 0.369 | 1.92286 | 18.9 |
| 3 | 1.488 | 1.220–0.318 | | |
| 4 | −0.989 | 0.738 | 1.81600 | 46.6 |
| 5 | −0.986 | 0.621–0.225 | | |
| 6 | 23.840 | 0.369 | 1.92286 | 18.9 |
| 7 | 1.925 | 0.857 | 1.77250 | 49.6 |
| 8 | −1.987 | 1.772–3.070 | | |
| 9 | ∞ | 1.300 | 1.51633 | 64.1 |
| 10 | ∞ | — | | |

Embodiment 5

Figure 17:
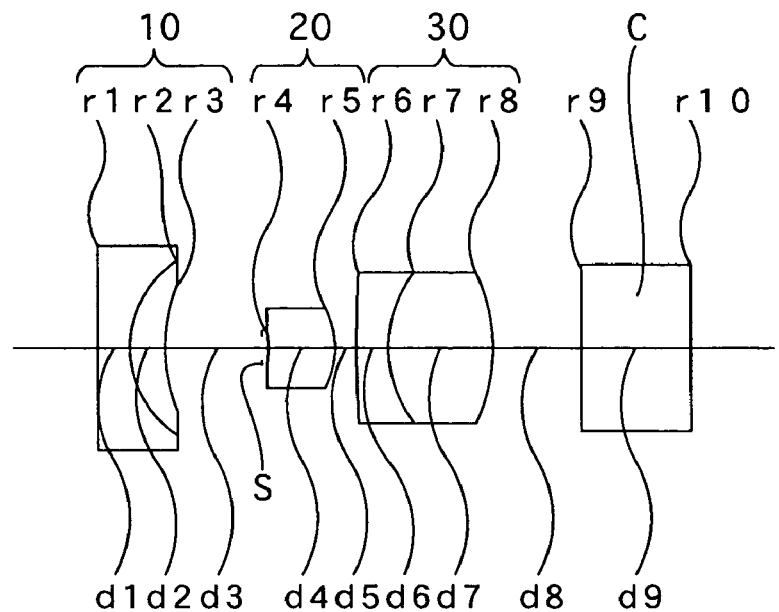
FIG. 17 is a lens arrangement of the imaging-optical system at normal viewing, according to a fifth embodiment of the present invention.
Figure 18:
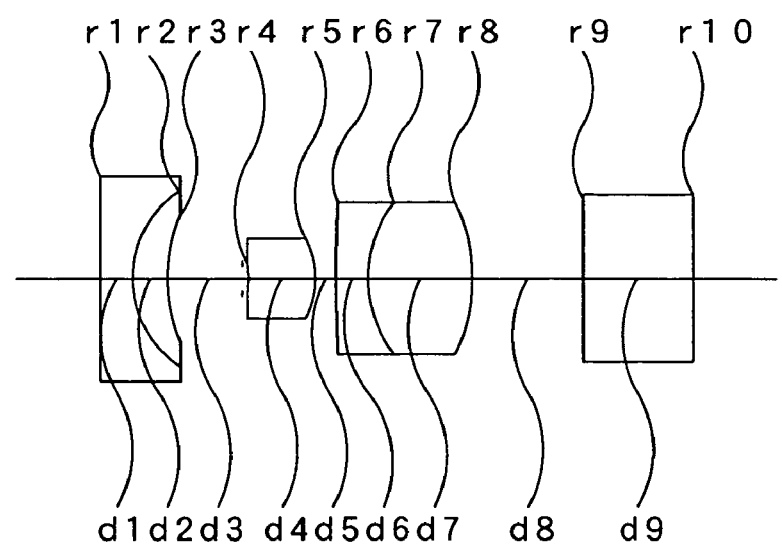
FIG. 18 is a lens arrangement of the imaging-optical system at magnified viewing, according to the fifth embodiment of the present invention.

FIG. 17 is the lens arrangement of the imaging-optical system at normal viewing. FIG. 18 is the lens arrangement of the imaging-optical system at magnified viewing.

The basic lens arrangement is the same as that of the first embodiment.

FIGS. 19A through 19D show aberrations occurred in the lens arrangement shown in FIG. 17. FIGS. 20A through 20D show aberrations occurred in the lens arrangement shown in FIG. 18.

Table 5 shows the numerical values of the fifth embodiment. The values which change between normal viewing and magnified viewing are indicated in this order of the terms.

The diaphragm S is 1.163 behind surface No. 3 at normal viewing state, and is 0.897 behind surface No. 3 at magnified viewing.

TABLE 5

FE = 1:5.7–5.8
f = 1.07–1.17
M = −0.079−−0.250
fB = 0.05

| Surf. No. | r | d | $N_d$ | $\nu_d$ |
|---|---|---|---|---|
| 1 | ∞ | 0.375 | 1.88300 | 40.8 |
| 2 | 1.271 | 0.418 | 1.92286 | 18.9 |
| 3 | 2.027 | 1.238–0.972 | | |
| 4 | −1.299 | 0.800 | 1.77250 | 49.6 |
| 5 | −1.000 | 0.244 | | |
| 6 | 21.038 | 0.375 | 1.84666 | 23.8 |
| 7 | 1.527 | 1.237 | 1.77250 | 49.6 |
| 8 | −2.126 | 1.055–1.321 | | |
| 9 | ∞ | 1.300 | 1.51633 | 64.1 |
| 10 | ∞ | — | | |

Embodiment 6

Figure 21:
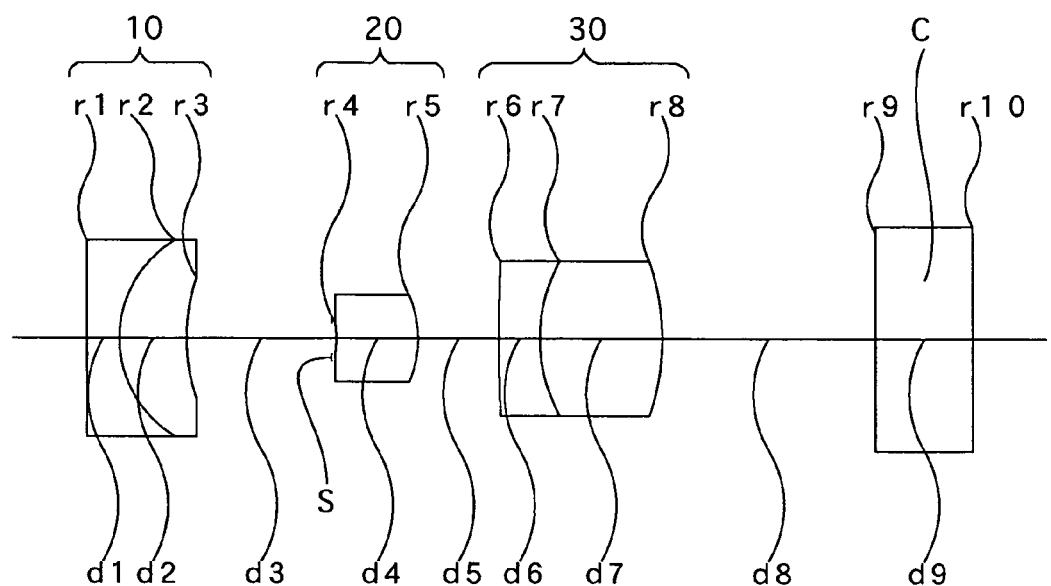
FIG. 21 is a lens arrangement of the imaging-optical system at normal viewing, according to a sixth embodiment of the present invention.
Figure 22:
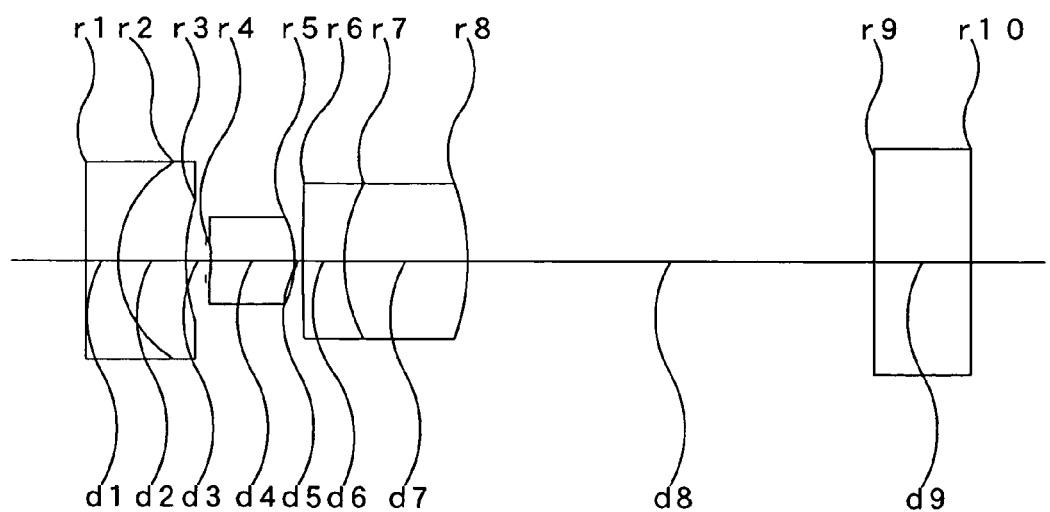
FIG. 22 is a lens arrangement of the imaging-optical system at magnified viewing, according to the sixth embodiment of the present invention.
Figure 23A:
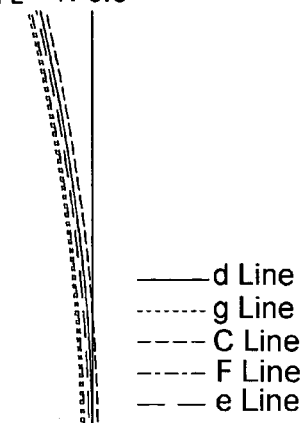
FIGS. 23A, 23B, 23C and 23D show aberrations occurred in the lens arrangement shown in FIG. 21.
Figure 23B:
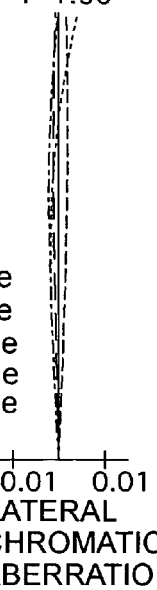
Figure 23C:
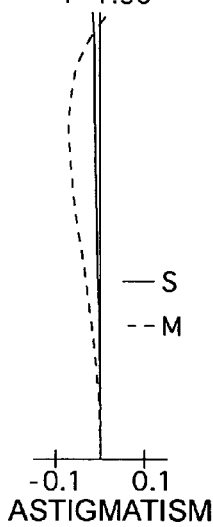
Figure 23D:
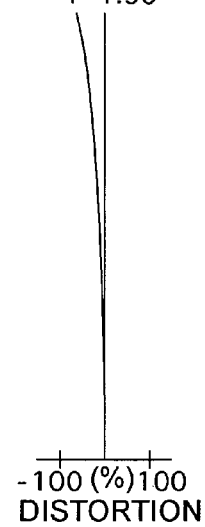
Figure 24A:
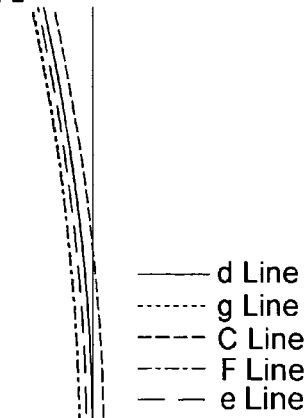
FIGS. 24A, 24B, 24C and 24D show aberrations occurred in the lens arrangement shown in FIG. 22.
Figure 24B:
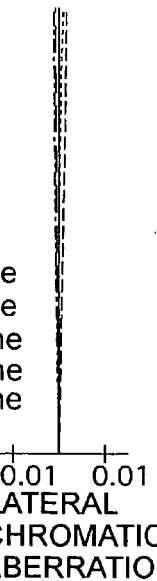
Figure 24C:
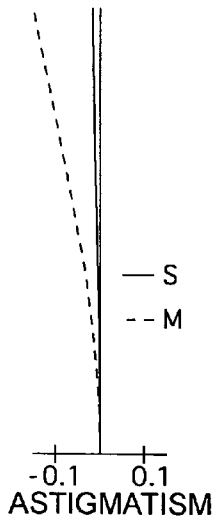
Figure 24D:
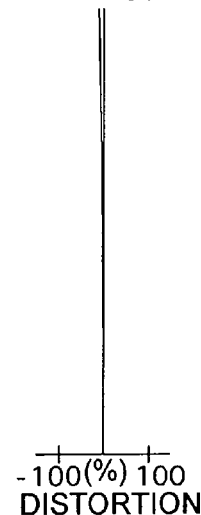

FIG. 21 is the lens arrangement of the imaging-optical system at normal viewing. FIG. 22 is the lens arrangement of the imaging-optical system at magnified viewing.

The basic lens arrangement is the same as that of the first embodiment.

FIGS. 23A through 23D show aberrations occurred in the lens arrangement shown in FIG. 21. FIGS. 24A through 24D show aberrations occurred in the lens arrangement shown in FIG. 22.

Table 6 shows the numerical values of the sixth embodiment. The values which change between normal viewing and magnified viewing are indicated in this order of the terms.

The diaphragm S is 1.918 behind surface No. 3 at normal viewing state, and is 0.273 behind surface No. 3 at magnified viewing.

TABLE 6

FE = 1:6.6–8.3
f = 1.59–2.51
M = −0.125−−0.818
fB = 0.05

| Surf. No. | r | d | $N_d$ | $\nu_d$ |
|---|---|---|---|---|
| 1 | ∞ | 0.440 | 1.88300 | 40.8 |
| 2 | 1.576 | 0.906 | 1.84666 | 23.8 |
| 3 | 2.698 | 1.984–0.339 | | |
| 4 | −1.418 | 1.102 | 1.88300 | 40.8 |
| 5 | −1.476 | 1.074–0.110 | | |
| 6 | 27.592 | 0.550 | 1.84666 | 23.8 |
| 7 | 2.244 | 1.650 | 1.77250 | 49.6 |
| 8 | −3.292 | 2.862–5.470 | | |
| 9 | ∞ | 1.300 | 1.51633 | 64.1 |
| 10 | ∞ | — | | |

Embodiment 7

Figure 25:
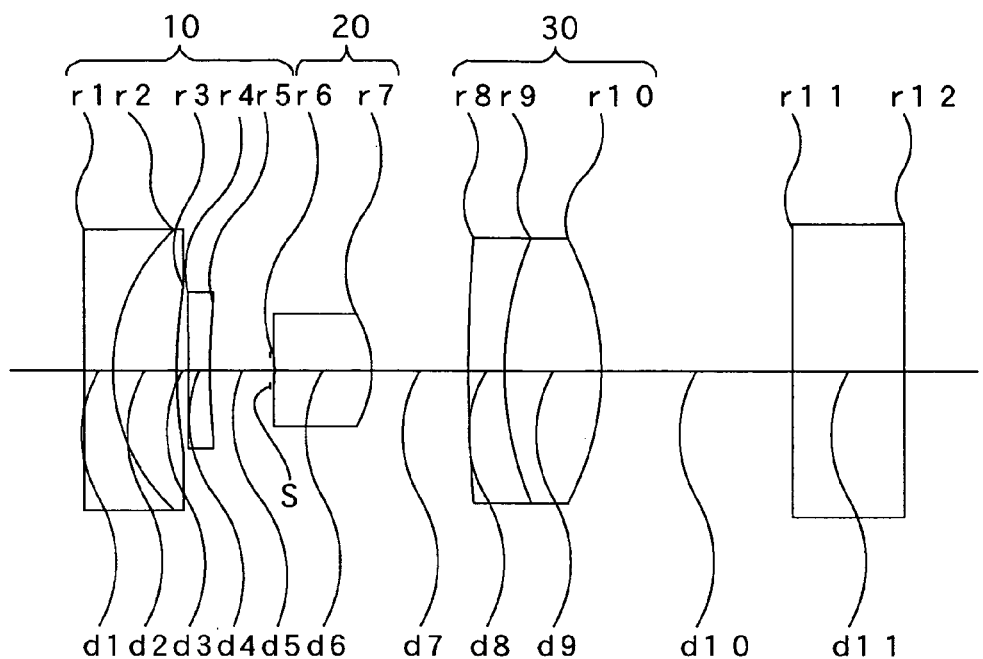
FIG. 25 is a lens arrangement of the imaging-optical system at normal viewing, according to a seventh embodiment of the present invention.
Figure 26:
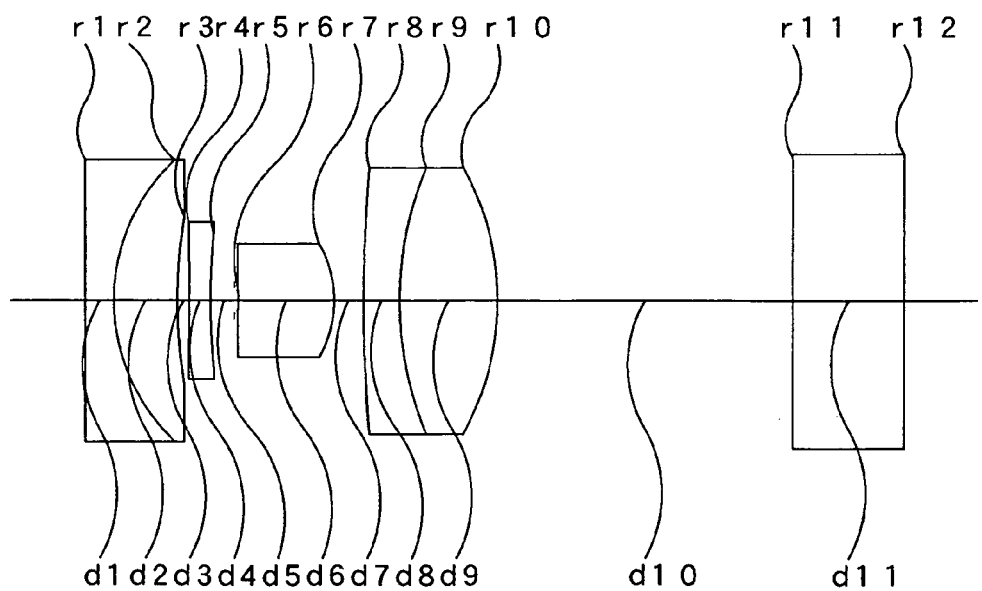
FIG. 26 is a lens arrangement of the imaging-optical system at magnified viewing, according to the seventh embodiment of the present invention.

FIG. 25 is the lens arrangement of the imaging-optical system at normal viewing. FIG. 26 is the lens arrangement of the imaging-optical system at magnified viewing.

Unlike the negative first lens group 10 of the first to sixth embodiments, the negative first lens group 10 of this seventh embodiment is constituted by the cemented lens elements having the negative lens element and the positive lens element, and the biconcave (negative) single lens element, in this order from the object. On the other hand, the arrangement of the positive second lens group 20 and that of the positive third lens group 30 are the same as the other embodiments.

FIGS. 27A through 27D show aberrations occurred in the lens arrangement shown in FIG. 25. FIGS. 28A through 28D show aberrations occurred in the lens arrangement shown in FIG. 26.

Table 7 shows the numerical values of the seventh embodiment. The values which change between normal viewing and magnified viewing are indicated in this order of the terms.

The diaphragm S is 0.827 behind surface No. 5 at normal viewing, and is 0.318 behind surface No. 5 at magnified viewing.

TABLE 7

FE = 1:8.2–9.0
f = 2.27–2.39
M = −0.176−−0.676
fB = 0.05

| Surf. No. | r | d | $N_d$ | $\nu_d$ |
|---|---|---|---|---|
| 1 | ∞ | 0.386 | 1.88300 | 40.8 |
| 2 | 2.641 | 0.868 | 1.92286 | 18.9 |
| 3 | 7.630 | 0.157 | | |
| 4 | −55.408 | 0.290 | 1.84666 | 23.8 |
| 5 | 9.391 | 0.885–0.376 | | |

TABLE 7-continued

FE = 1:8.2–9.0
f = 2.27–2.39
M = −0.176—0.676
fB = 0.05

| Surf. No. | r | d | $N_d$ | $\nu_d$ |
|---|---|---|---|---|
| 6 | −1.799 | 1.303 | 1.77250 | 49.6 |
| 7 | −1.563 | 1.296–0.392 | | |
| 8 | 22.265 | 0.482 | 1.92286 | 18.9 |
| 9 | 4.783 | 1.321 | 1.77250 | 49.6 |
| 10 | −3.791 | 2.594–4.006 | | |
| 11 | ∞ | 1.500 | 1.51633 | 64.1 |
| 12 | ∞ | — | | |

The numerical values of each embodiment for each condition are shown in Table 8.

| | (1) | (2) | (3) | (4) | (5) | (6) | (7) | (8) | (9) |
|---|---|---|---|---|---|---|---|---|---|
| Embod. 1 | 1.60 | 1.47 | −0.62 | 18.9 | 1.883 | −2.57 | 2.11 | 2.25 | 2.08 |
| Embod. 2 | 1.47 | 1.40 | −0.80 | 18.9 | 1.883 | −1.83 | 2.65 | 1.96 | 1.87 |
| Embod. 3 | 1.47 | 1.21 | −0.57 | 18.9 | 1.883 | −2.60 | 2.64 | 2.20 | 1.82 |
| Embod. 4 | 1.62 | 1.04 | −1.02 | 18.9 | 1.883 | −1.59 | 2.67 | 1.82 | 1.16 |
| Embod. 5 | 1.18 | 1.09 | −0.53 | 18.9 | 1.883 | −2.21 | 2.63 | 1.42 | 1.31 |
| Embod. 6 | 0.99 | 0.63 | −0.54 | 23.8 | 1.883 | −1.84 | 2.72 | 1.41 | 0.90 |
| Embod. 7 | 1.16 | 1.11 | −0.56 | 18.9 | 1.883 | −2.07 | 2.09 | 2.11 | 2.00 |

As can be understood from Table 8, the numerical values of the first through seventh embodiments satisfy conditions (1) through (9). Furthermore, as shown in the aberration diagrams, the various aberrations, especially magnification chromatic aberration and astigmatism, are relatively well corrected at a normal viewing state and at a magnified viewing state.

According to the above description, an imaging-optical system with the following advantages can be obtained:
(i) the imaging-optical system can be miniaturized; and
(ii) both normal viewing at the short focal length extremity and magnified viewing at the maximum magnification position can be carried out while aberrations, particularly lateral chromatic aberration and astigmatism, are suitably corrected.

What is claimed is:

1. An imaging-optical system comprising a negative first lens group, a positive second lens group and a positive third lens group, in this order from an object,
   wherein a zooming operation is performed by moving said positive second lens group and said positive third lens group while an object distance to said object is being varied without varying a distance from the most object-side surface of said negative first lens group to the imaging plane;
   wherein an in-focus state of said imaging-optical system is maintained while the focal length of said imaging-optical system is being varied through said zooming operation;
   wherein said negative first lens group comprises cemented lens elements, and said cemented lens elements are positioned at the most object-side of said negative first lens group; and
   wherein said cemented lens elements satisfy the following condition:

$0.9 < Ra/fw < 2.0$ wherein
   Ra designates the radius of curvature of a bonding surface of said cemented lens elements of said negative first lens group; and
   fw designates the focal length of said imaging-optical system at the short focal length extremity.

2. The imaging-optical system according claim 1, satisfying the following condition:

$0.6 < Ra/ft < 2.0$ wherein
   Ra designates the radius of curvature of said bonding surface of said cemented lens elements of said negative first lens group; and
   ft designates the focal length of said imaging-optical system at the maximum magnification position.

3. The imaging-optical system according claim 1, satisfying the following conditions:

$\nu12 < 30$ $n11 > 1.8$ wherein
   ν12 designates the Abbe number of an image-side lens element of said cemented lens elements of said negative first lens group; and
   n11 designates the refractive index of an object-side lens element of said cemented lens elements of said negative first lens group.

4. The imaging-optical system according claim 1, wherein said negative first lens group consists of said cemented lens elements having a negative refractive power.

5. The imaging-optical system according claim 1, satisfying the following conditions:

$-3.0 < f1/fw < -1.5$ $2 < f3/fw < 3$ wherein
   f1 designates the focal length of said negative first lens group;
   f3 designates the focal length of said positive third lens group; and
   fw designates the focal length of said imaging-optical system at the short focal length extremity.

6. The imaging-optical system according claim 1, wherein said positive third lens group comprises cemented lens elements comprising a negative lens element and a positive lens element; and
   wherein said cemented lens elements satisfy the following conditions:

$1.2 < |Rb|/fw < 2.5$ $0.8 < |Rb|/ft < 2.3$ wherein
   Rb designates the radius of curvature of a bonding surface of said cemented lens elements of said positive third lens group;
   fw designates the focal length of said imaging-optical system at the short focal length extremity; and ft designates the focal length of said imaging-optical system at the maximum magnification position.

7. An endoscope comprising an imaging optical system according to claim 1.

8. An imaging-optical system comprising a negative first lens group, a positive second lens group and a positive third lens group, in this order from an object,
wherein a zooming operation is performed by moving said positive second lens group and said positive third lens group while an object distance to said object is being varied without varying a distance from the most object-side surface of said negative first lens group to the imaging plane;
wherein an in-focus state of said imaging-optical system is maintained while the focal length of said imaging-optical system is being varied through said zooming operation;
wherein said negative first lens group comprises cemented lens elements, and said cemented lens elements are positioned at the most object-side of said negative first lens group; and
wherein said cemented lens elements satisfy the following condition:

$$-1.1 < Ra/f1 < -0.5$$

wherein
Ra designates the radius of curvature of a bonding surface of said cemented lens elements of said negative first lens group; and
f1 designates the focal length of said negative first lens group.

9. The imaging-optical system according claim 8, satisfying the following condition:

$$0.6 < Ra/ft < 2.0$$

wherein
Ra designates the radius of curvature of said bonding surface of said cemented lens elements of said negative first lens group; and
ft designates the focal length of said imaging-optical system at the maximum magnification position.

10. The imaging-optical system according claim 8, satisfying the following conditions:

$$v12 < 30$$

$$n11 > 1.8$$

wherein
v12 designates the Abbe number of an image-side lens element of said cemented lens elements of said negative first lens group; and
n11 designates the refractive index of an object-side lens element of said cemented lens elements of said negative first lens group.

11. The imaging-optical system according claim 8, wherein said negative first lens group consists of said cemented lens elements having a negative refractive power.

12. The imaging-optical system according claim 8, satisfying the following conditions:

$$-3.0 < f1/fw < -1.5$$

$$2 < f3/fw < 3$$

wherein
f1 designates the focal length of said negative first lens group;
f3 designates the focal length of said positive third lens group; and
fw designates the focal length of said imaging-optical system at the short focal length extremity.

13. The imaging-optical system according claim 8, wherein said positive third lens group comprises cemented lens elements comprising a negative lens element and a positive lens element; and
wherein said cemented lens elements satisfy the following conditions:

$$1.2 < |Rb|/fw < 2.5$$

$$0.8 < |Rb|/ft < 2.3$$

wherein
Rb designates the radius of curvature of a bonding surface of said cemented lens elements of said positive third lens group;
fw designates the focal length of said imaging-optical system at the short focal length extremity; and
ft designates the focal length of said imaging-optical system at the maximum magnification position.

14. An endoscope comprising an imaging optical system according to claim 8.

* * * * *